(No Model.)

E. DIMITY.
CULTIVATOR FOR LISTED CORN.

No. 494,130. Patented Mar. 28, 1893.

Witnesses
T. Scott Morrison
E. E. Hoopes

Inventor:
Engelhard Dimity.
By H. W. Stackpole, his atty.

UNITED STATES PATENT OFFICE.

ENGELHARD DIMITY, OF CLAY CENTRE, KANSAS.

CULTIVATOR FOR LISTED CORN.

SPECIFICATION forming part of Letters Patent No. 494,130, dated March 28, 1893.

Application filed April 21, 1891. Renewed January 24, 1893. Serial No. 459,607. (No model.)

*To all whom it may concern:*

Be it known that I, ENGELHARD DIMITY, a citizen of the United States, residing at Clay Centre, in the county of Clay and State of Kansas, have invented certain new and useful Improvements in Cultivators for Listed Corn; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in cultivators for listed-corn and has reference more particularly to the invention patented to me and described in Letters Patent No. 392,997, issued November 20, 1888.

The objects of my improvements are to facilitate the use and operation of the cultivator and at the same time simplifying the construction thereof by eliminating superfluous parts formerly used, thus cheapening the cost while adding much to the usefulness of the implement. These objects I attain by means of the mechanism illustrated in the accompanying drawings, in which:—

Figure 1:
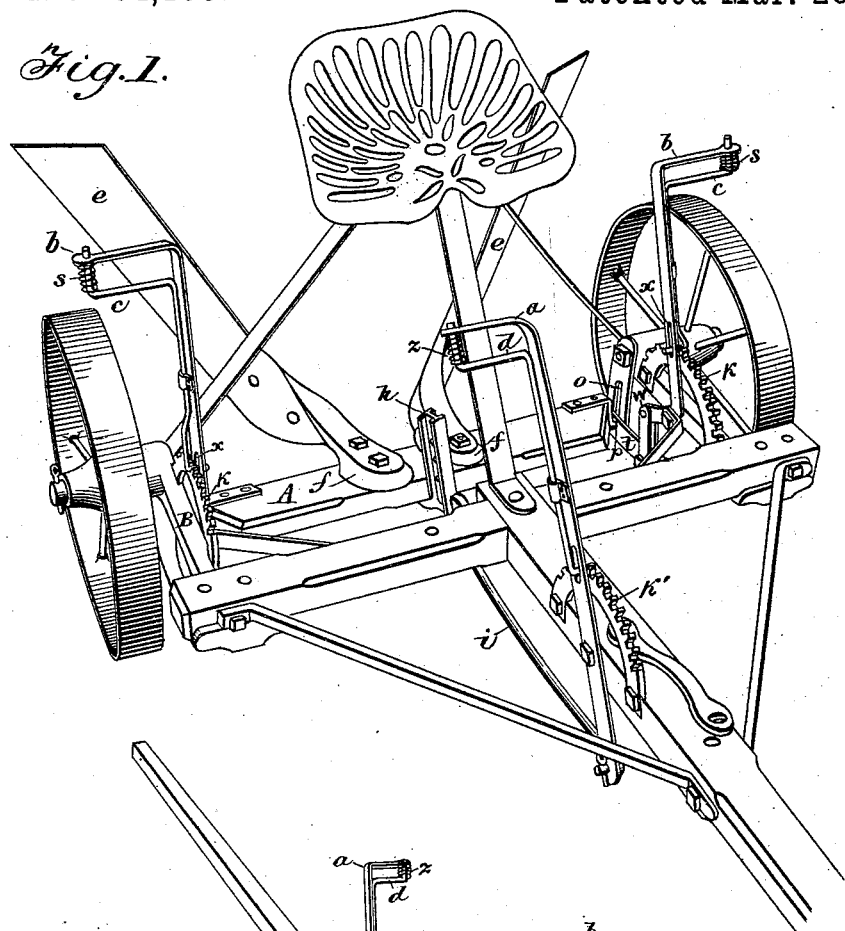
Figure 2:
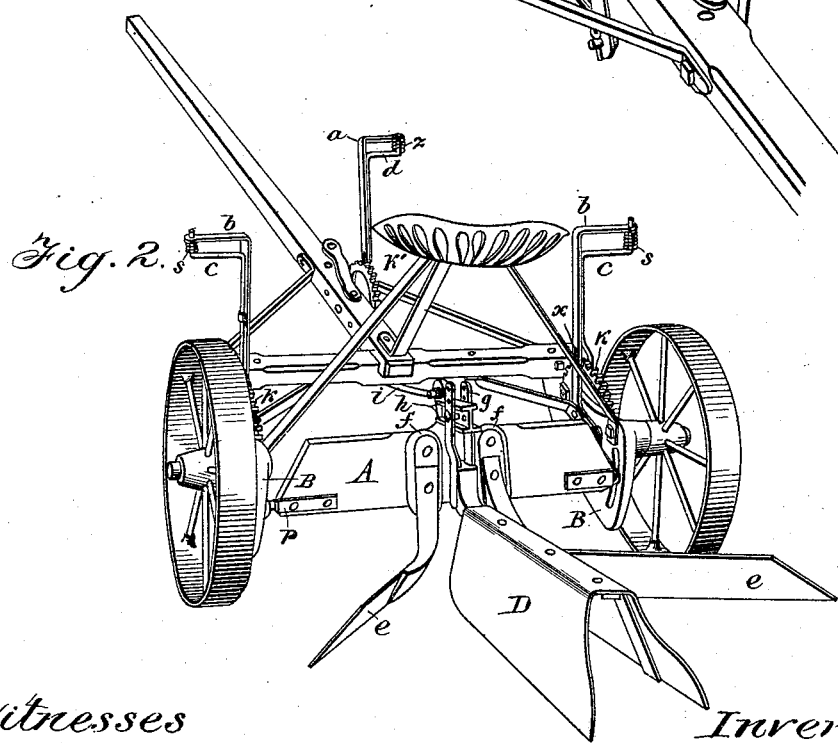

Figure 1, is a perspective front view of my cultivator with the fender omitted and Fig. 2 a rear view of the same in perspective showing the fender attached.

Similar letters refer to similar parts throughout the several views.

To the cross-head (A) are secured knives (e e) by means of brackets (f f) bolted thereto, said bolts passing through slots lengthwise of said cross-head, thus enabling the operator to adjust the plane of the heel of said knives as also the distance between the same. Said cross-head (A) is journaled in the slots (o o) in the crank-arms (B B), the journals (p p) passing through the ends of arms (t t) the opposite ends of which are pivoted to said crank-arms (B B) and operated by the crank levers (b b) and connecting arms (w w). The cross-head (A) and with it the knives (e e) may thus be raised or lowered by means of said levers (b b) and held in position by the pawls (c c) engaging ratchets (k k). Said pawls are steadied in their position by passing through slots (x x) formed in the levers b b and are caused by springs (s s) to automatically engage said ratchets. The connecting rod (i) hinged to the top or forward edge of said body (A) and to the lever (a), which, with the omission of the crank, I construct on the same principle as levers (b b), enables the operator to adjust the plane of the knives even to the extent of throwing them entirely clear of the ground and into position where they will not interfere with the free transportation of the implement to and from the field. The said lever a is provided with a pawl d having a spring z by which it is automatically engaged and held in a ratchet k' so as to retain the knives in the plane to which they may have been adjusted. A lug or extension (h) secured to said cross-head (A) and provided with a series of holes and the jaws (g g) secured to fender (D) and also provided with a series of holes as shown, enables the operator to adjust the fender either vertically or horizontally in the line of travel.

It will be readily seen that my construction of a cultivator as above described leaves all parts of the implement to be freely and quickly adjusted either separately or together thus adapting the same to operate effectively in any kind of soil or depth of furrow.

Having thus described my invention, what I claim as new, and desire to secure by Letters Patent, is—

1. In a cultivator, the combination with the frame and the slotted crank-arms B, of the rocking cross head A, the knives e adjustably secured thereto and means for rocking said cross head and adjusting the knives thereon, substantially as shown and described.

2. In a cultivator, the combination with the frame and the slotted crank arms B, of the rocking cross head A having journals p, the arms t pivoted to the crank arms B, the crank levers b connected with the arms t, the pawls c, the ratchets k, and the knives e secured to the cross head, substantially as shown and described.

3. In a cultivator, the combination with the frame and the slotted crank arms B, of the rocking cross head A provided with knives e, the rod i, the lever a provided with pawl d, and the ratchet k', substantially as shown and described.

4. In a cultivator, the combination with the adjustable rocking cross-head A, and its attached knives, of the lever a for varying the inclination of said cross head and knives and the levers b for raising and lowering the same, substantially as shown and described.

In testimony whereof I affix my signature in presence of two witnesses.

ENGELHARD DIMITY.

Witnesses:
O. C. HEIDEL,
T. S. MORRISON.